United States Patent
Shuvalov

(10) Patent No.: US 12,494,807 B2
(45) Date of Patent: Dec. 9, 2025

(54) RECEIVER CIRCUIT

(71) Applicant: NXP USA, INC., Austin, TX (US)

(72) Inventor: Denis Sergeevich Shuvalov, Munich (DE)

(73) Assignee: NXP USA, Inc., Austin, TX (US)

( * ) Notice: Subject to any disclaimer, the term of this patent is extended or adjusted under 35 U.S.C. 154(b) by 96 days.

(21) Appl. No.: 18/632,373

(22) Filed: Apr. 11, 2024

(65) Prior Publication Data

US 2024/0356572 A1  Oct. 24, 2024

(30) Foreign Application Priority Data

Apr. 20, 2023  (EP) ..................... 23168998

(51) Int. Cl.
*H04B 1/16* (2006.01)
(52) U.S. Cl.
CPC ..................... *H04B 1/16* (2013.01)
(58) Field of Classification Search
CPC .......................................... H04B 1/16
USPC ........................................ 375/316
See application file for complete search history.

(56) References Cited

U.S. PATENT DOCUMENTS

| | | | |
|---|---|---|---|
| 6,304,357 B1 | 10/2001 | Ohhata et al. | |
| 6,909,082 B2 | 6/2005 | Doh et al. | |
| 7,265,626 B2 | 9/2007 | Teo et al. | |
| 7,382,166 B1 | 6/2008 | Ide | |
| 7,539,424 B2 | 5/2009 | Kang et al. | |
| 7,663,089 B2 | 2/2010 | Sakura | |

(Continued)

FOREIGN PATENT DOCUMENTS

| | | |
|---|---|---|
| CN | 111130477 A | 5/2020 |
| CN | 114900143 A | 8/2022 |

(Continued)

OTHER PUBLICATIONS

Cheng, X., "A feed-forward AGC circuit with 48 dB-gain range, 1.2 μs minimum settling time for WiMAX receiver", Analog Integrated Circuits and Signal Processing 76, May 2013.

*Primary Examiner* — Lihong Yu

(57) ABSTRACT

A receiver circuit, comprising: an receiver-input-terminal configured to receive input-signalling; an receiver-output-terminal configured to provide output-signalling; a plurality of sub-receivers, each configured to compare the received input-signalling with a different effective threshold value in order to provide a digital sub-receiver-output-signal, wherein the different effective threshold values have weighted values in a sequence between a least significant value and a most significant value; a controller configured to, in response to detecting calibration-signalling at the receiver-input-terminal: process the digital sub-receiver-output-signals in order to identify the sub-receiver with the most significant effective threshold value that is triggered by the calibration-signalling as a triggered-sub-receiver; identify a preceding-sub-receiver as the sub-receiver that has an effective threshold value that is before that of the triggered-sub-receiver in the sequence of weighted effective threshold values; and configure the receiver circuit such that, for subsequent signal processing, the sub-receiver-output-signal from the preceding-sub-receiver is provided to the receiver-output-terminal.

20 Claims, 5 Drawing Sheets

(56) References Cited

U.S. PATENT DOCUMENTS

| | | |
|---|---|---|
| 7,835,098 B2 | 11/2010 | Mukai et al. |
| 8,023,835 B2 | 9/2011 | Kim et al. |
| 8,705,985 B2 | 4/2014 | Christensen |
| 9,059,807 B2 | 6/2015 | Ossieur et al. |
| 9,252,889 B2 | 2/2016 | Chrsitensen |
| 10,333,516 B2 | 6/2019 | Li et al. |
| 10,615,763 B2 | 4/2020 | Ahmed et al. |
| 10,756,690 B2 | 8/2020 | Ahmed et al. |
| 11,005,573 B2 | 5/2021 | Papanikolaou et al. |
| 11,463,177 B2 | 10/2022 | Papanikolaou et al. |
| 2004/0145402 A1 | 7/2004 | Burns et al. |
| 2007/0139118 A1* | 6/2007 | Teo ................. H03G 3/001 |
| | | 330/279 |
| 2007/0286609 A1 | 12/2007 | Ikram et al. |
| 2009/0189690 A1 | 7/2009 | Lu et al. |
| 2014/0376666 A1 | 12/2014 | Oehler et al. |

FOREIGN PATENT DOCUMENTS

| | | |
|---|---|---|
| GB | 2280998 A | 2/1995 |
| GB | 2307806 A | 6/1997 |

\* cited by examiner

RECEIVER CIRCUIT

CROSS-REFERENCE TO RELATED APPLICATIONS

The application claims the priority under 35 U.S.C. § 119 of European Patent application no. 23168998.5, filed on 20 Apr. 2023, the contents of which are incorporated by reference herein.

FIELD

The present disclosure relates to receiver circuits, and in particular to receiver circuits that provide feed-forward automatic gain calibration.

SUMMARY

According to a first aspect of the present disclosure there is provided a receiver circuit, comprising:
an receiver-input-terminal configured to receive input-signalling;
an receiver-output-terminal configured to provide output-signalling;
a plurality of sub-receivers, each configured to compare the received input-signalling with a different effective threshold value in order to provide a digital sub-receiver-output-signal, wherein the different effective threshold values have weighted values in a sequence between a least significant value and a most significant value;
a controller configured to, in response to detecting calibration-signalling at the receiver-input-terminal:
process the digital sub-receiver-output-signals in order to identify the sub-receiver with the most significant effective threshold value that is triggered by the calibration-signalling as a triggered-sub-receiver;
identify a preceding-sub-receiver as the sub-receiver that has an effective threshold value that is before that of the triggered-sub-receiver in the sequence of weighted effective threshold values; and
configure the receiver circuit such that, for subsequent signal processing, the sub-receiver-output-signal from the preceding-sub-receiver is provided to the receiver-output-terminal.

Advantageously, such a receiver circuit can provide very fast feedforward calibration without requiring a large circuit overhead.

In one or more embodiments each of the plurality of sub-receivers comprises:
an amplifier, wherein the amplifier has: an amplifier-input-terminal that is configured to receive the input-signalling from the receiver-input-terminal; and an amplifier-output-terminal that is configured to provide an amplifier-output-signal based on an associated gain factor; and
a comparator, wherein the comparator is configured to compare the amplifier-output-signal with a threshold value in order to provide the digital sub-receiver-output-signal.

In one or more embodiments the amplifiers and comparators of two or more of the sub-receivers are configured to apply different gain factors and/or threshold values such that the associated sub-receiver is configured to compare the received input-signalling with an effective threshold value that is based on the gain factor and threshold value. For example, based on the product of the gain factor and threshold value.

In one or more embodiments the comparators of the two or more sub-receivers are configured to compare the amplifier-output-signal from its associated amplifier with the same threshold value, but with different effective threshold values that are based on different gain factors.

In one or more embodiments the two or more amplifiers are provided in parallel such that their amplifier-input-terminals are connected together such that they receive the same amplifier-input-signal.

In one or more embodiments the amplifiers of one or more of the sub-receivers are provided in series such that:
the amplifier-input-terminal of the amplifier of the one or more of the sub-receivers is connected to the amplifier-output-terminal of the amplifier of another one of the sub-receivers.

In one or more embodiments:
the amplifier-input-terminal of the amplifier of a first sub-receiver is connected to the receiver-input-terminal; and
the amplifier-input-terminals of the amplifiers of the other sub-receivers are connected to the amplifier-output-terminal of the amplifier of another one of the sub-receivers.

In one or more embodiments the amplifiers of two or more of the sub-receivers are configured to apply the same gain factor.

In one or more embodiments the comparators of the sub-receivers are configured to compare the amplifier-output-signal from its associated amplifier with the same threshold value.

In one or more embodiments the controller is configured to:
for subsequent signal processing, disable one or more of the sub-receivers, but not the preceding-sub-receiver.

In one or more embodiments the controller is configured to:
for subsequent signal processing, disable one or more of the sub-receivers, but not:
the preceding-sub-receiver; and
one or more sub-receivers that are configured to apply effective threshold values that are neighbours to the effective threshold value of the preceding-sub-receiver in the sequence of weighted effective threshold values.

In one or more embodiments the controller is configured to disable one or more of the sub-receivers, but not:
one or more sub-receivers that are configured to apply effective threshold values that have effective threshold values that are higher than that of the preceding-sub-receiver in the sequence of weighted effective threshold values; and or
one or more sub-receivers that are configured to apply effective threshold values that have effective threshold values that are lower than that of the preceding-sub-receiver in the sequence of weighted effective threshold values.

In one or more embodiments the receiver circuit comprises an optical receiver circuit.

In one or more embodiments:
the amplifier comprises a current mirror, that is configured to provide three scaled output signals:
a first scaled output signal that is provided to a valley detector for one or more of the plurality of sub-receivers, wherein the valley detector is configured to detect the minimum value of the first scaled output signal;

a second scaled output signal that is provided as an input to a peak detector for one of the plurality of sub-receivers; and a third scaled output signal for current comparison by the comparator, wherein the valley detector is configured to provide two output signals:

a first valley detector output signal, which represents the minimum value of the first scaled output signal, that is provided as another input to the peak detector such that it is subtracted from the second scaled output signal;

a second valley detector output signal, which represents the minimum value of the first scaled output signal, for current comparison by the comparator;

wherein the peak detector is configured to provide on its output the highest value among its inputs, either: i) the amplitude of the received input-signalling as provided by the second scaled output signal, divided by 2; or ii) the threshold value of the comparator;

wherein the comparator is configured to provide the digital sub-receiver-output-signal based on a comparison of the peak detector output signal and the third scaled output signal.

In one or more embodiments, for the subsequent signal processing, the input of the peak detector that is provided by the second scaled output signal is disabled.

In one or more embodiments, each of the peak detector and the valley detector comprise one or more hold capacitors. Each of each of the peak detector and the valley detector may be configured to discharge their holding capacitors to track amplitude/offset changes.

According to further aspect of the present disclosure, there is provided a method of calibrating a receiver circuit, the receiver circuit comprising a plurality of sub-receivers, the method comprising:

each of the plurality of sub-receivers comparing received input-signalling with a different effective threshold value in order to provide a digital sub-receiver-output-signal, wherein the different effective threshold values have weighted values in a sequence between a least significant value and a most significant value;

in response to detecting calibration-signalling at the receiver-input-terminal:

processing the digital sub-receiver-output-signals in order to identify the sub-receiver with the most significant effective threshold value that is triggered by the calibration-signalling as a triggered-sub-receiver;

identifying a preceding-sub-receiver as the sub-receiver that has an effective threshold value that is before that of the triggered-sub-receiver in the sequence of weighted effective threshold values; and configuring the receiver circuit such that, for subsequent signal processing, the sub-receiver-output-signal from the preceding-sub-receiver is provided to a receiver-output-terminal.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Automatic Gain Control (AGC) is an important block for wireless receivers that process a high dynamic range of input signal amplitudes. AGC systems can utilize closed-loop feedback topology to continuously adjust gain of a signal path to maintain a fixed output amplitude for different input signal amplitudes. However, loop stability can restrict gain control settling speed and can require some "dummy" signal, such as a message preamble. Open-loop AGC, which can utilize feed-forward gain control, does not suffer from stability constraints and can demonstrate very fast gain settling speeds. However, such solutions can use an auxiliary path, can have a peak detector and/or an ADC (analogue-to-digital converter) to estimate signal amplitude and to control gain of the main signal path.

Various of the examples disclosed herein were driven by the design of an infra-red (IR) optical system operating at 2MBaud speed with a dynamic range (DR) of the input signal from few µA to mA, ~60 dB. Such a system can be suitable for free-to-air and low-cost plastic fibre communication between battery management system (BMS) units, for example. To provide compatibility with existing communication protocols left almost no time, (for example, much less than 1 µs), for gain control settling.

As will be discussed in detail below, examples disclosed herein relate to a wireless receiver that utilizes multiple sub-receivers and re-uses them for the purpose of instant high-speed feedforward gain calibration. For some applications, it can be advantageous that the receiver does not require auxiliary calibration circuits or a programmable/variable gain amplifier in the primary signal path. This is because all processing can be performed by multiple signal paths, which work in different ranges of signal amplitudes.

Figure 1:
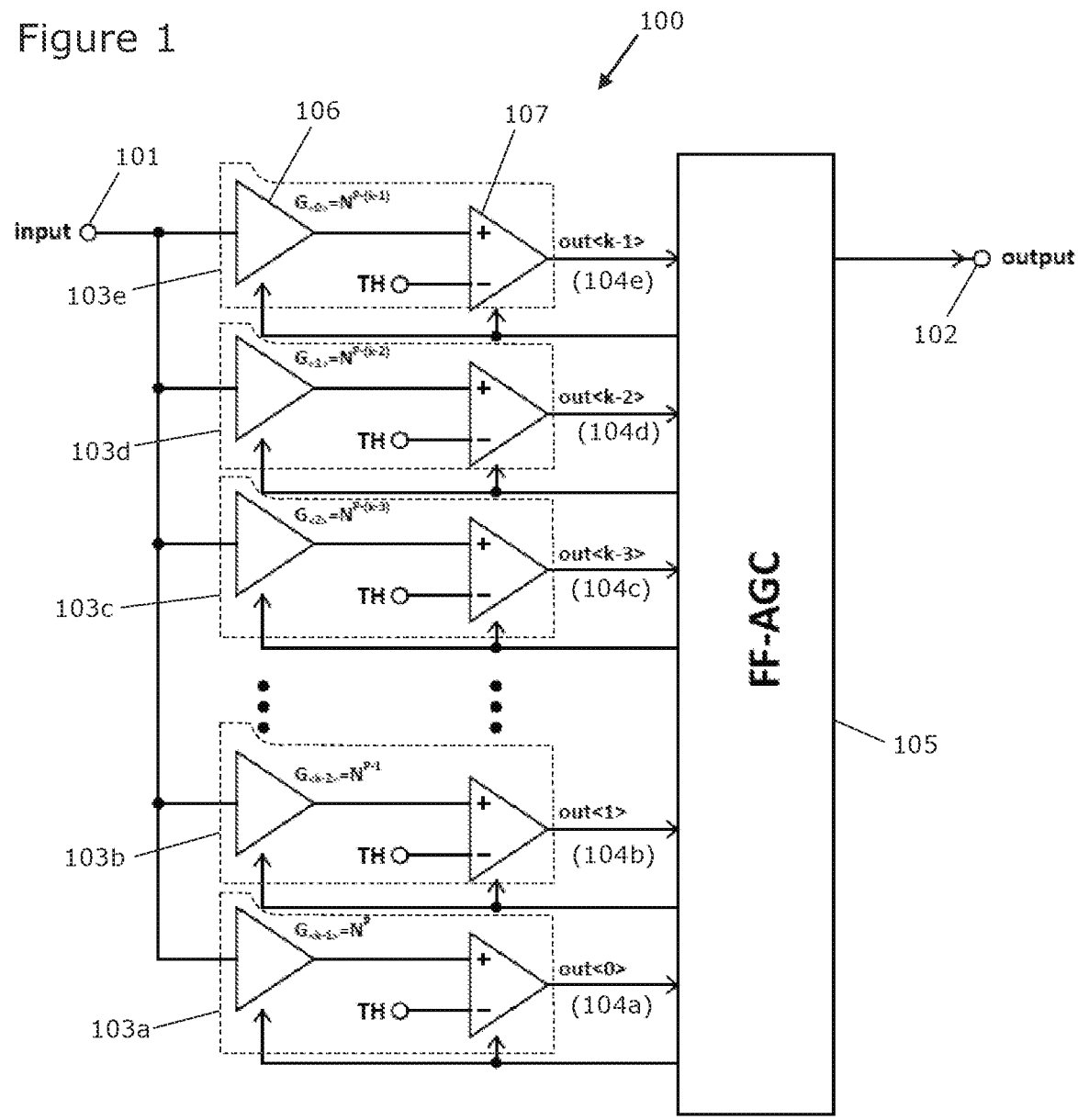
FIG. 1 shows an example embodiment of a receiver circuit.

FIG. 1 shows an example embodiment of a receiver circuit 100. The receiver circuit 100 includes a receiver-input-terminal 101 and a receiver-output-terminal 102. The receiver-input-terminal 101 receives input-signalling. The receiver-output-terminal provides output-signalling. The receiver circuit 100 can be calibrated such that it provides automatic gain control (AGC). The topology that is shown in FIG. 1 can be considered as a receiver topology that functions like a flash type ADC, which estimates at calibration the strength of the input-signalling at the receiver-input-terminal 101 and sets the gain that is applied by the receiver 100 for subsequent signal processing.

The receiver 100 includes a plurality of sub-receivers 103a-103e. Although five sub-receivers 103a-103e are shown in FIG. 1, it will be appreciated that more or fewer sub-receivers can be included in other examples. Each of the sub-receivers 103a-103e compares the received input-signalling with a different effective threshold value in order to provide a digital sub-receiver-output-signal 104a-104e. In this way, a sub-receiver is triggered (i.e., it's digital sub-receiver-output-signal 104a-104c is set high in this example) when the input-signalling exceeds its associated effective threshold value. The different effective thresholds have weighted values in a sequence between a most significant value and a least significant value. In this example, the effective threshold values are multiplied by a factor of 2 as the sequence progresses. As will be discussed below, the sequence of effective threshold values can be implemented in different ways which can include them being particularly suitable for voltage or current values.

The receiver 100 also includes a controller 105, which in FIG. 1 is labelled with "FF-AGC" as it can be considered as applying a Feed-Forward Automatic Gain Control (FF-AGC) algorithm.

The controller 105 can detect calibration-signalling at the receiver-input-terminal 101. Such calibration-signalling, and it's associated detection, can be implemented in any of a number of ways, as will be discussed below with reference to FIG. 3.

In response to detecting calibration-signalling at the receiver-input-terminal 101, the controller 105 processes the digital sub-receiver-output-signals 104a-104e in order to identify the sub-receiver 103a-103e with the most significant effective threshold value that is triggered by the calibration-signalling as a triggered-sub-receiver. It will be appreciated that because the sub-receivers 103a-103e apply different effective threshold values, the specific amplitude/value of the calibration-signalling can exceed some, but not all, of the effective threshold values. Indeed, the effective threshold values can be given values that correspond to the intended dynamic range of the receiver circuit 100 such that this is the case.

Each of the plurality of sub-receivers includes an amplifier 106 and a comparator 107. Each amplifier 106 has an amplifier-input-terminal and an amplifier-output-terminal. The amplifier-output-terminal provides an amplifier-output-signal. The comparator 107 compares the amplifier-output-signal with a threshold value in order to provide the digital sub-receiver-output-signal.

In the example of FIG. 1, amplifiers 106 of the sub-receivers are connected to the receiver-input-terminal 101 in parallel with each other. In this way, the receiver-input-terminal 101 of each of the amplifiers 106 are directly connected to the receiver-input-terminal 101 such that they each receive the same calibration-signalling. The amplifiers 106 and/or comparators 107 of the different sub-receivers can therefore apply different gain factors and/or different thresholds, respectively, such that the associated sub-receivers are configured to compare the received calibration-signalling with different effective threshold values, whereby the different effective threshold values are based on the gain factor and thresholds that are applied by the corresponding sub-receiver. For the sake of the simplicity, the depicted receiver circuit 100 utilizes the comparators 107, that compare the amplifier-output-signal from its associated amplifier with the same threshold value, and the amplifiers 106 have different gain factors, so the sub-receivers overall apply different effective threshold values. As only weight between effective threshold values matters, there are plenty of potential gain/threshold combinations, which can be utilized for the same effective threshold of a sub-receiver.

As shown in FIG. 1, the receiver circuit 100 includes "k" sub-receivers 103a-103e (five of which are shown). The sub-receivers 103a-103e, each have an amplifier 106 that applies a weighted, but different, gain factor. The gain factor of each amplifier 106 in this example is:

$$G_{<i>} = N^{P-i}$$

Where:
i is the index of the sub-receiver, which can take a value between 0 and k−1. i=0 represents the least significant value. i=k−1 represents the most significant value;
N is a radix, which can take any positive number. In a convenient example N=2.
P is an offset, which represents a design selection parameter. The value of P can be dictated by the range of the input signalling and the threshold that is utilized by the comparators 107.

The following example values of P (for N=2), result in the following weighted sequence of gain factors/effective thresholds (where: LSB is the least significant bit/value; and MSB is the most significant bit/value):

P=0, LSB->MSB gains are 1, ½, ¼, . . . , $1/N^{k-1}$
P=2, LSB->MSB gains are 4, 2, 1, . . . , $1/N^{k-3}$
P=−2, LSB->MSB gains are ¼, ⅛, ¹⁄₁₆, . . . , $1/N^{k+1}$
P=(k−1), MSB->LSB gains are 1,2,4, . . . , $N^{k-1}$
P=(k−1−2), MSB->LSB gains are ¼, ½, 1, . . . , $N^{k-3}$
P=(k−1+2), MSB->LSB gains are 4, 8, 16, . . . , $N^{k+1}$ The first three example values for P (P=0, P=2, P=−2) can be particularly well-suited for sub-receivers that operate in a current mode. The last three example values for P (P=(k−1), P=(k−1−2), P=(k−1+2)) can be particularly well-suited for sub-receivers that operate in a voltage mode.

In this parallel implementation, for simplicity all of the comparators 107 of the sub-receivers compare the amplifier-output-signal from their associated amplifiers 106 with the same threshold value, TH. So, the effective threshold value of each <i> sub-receiver is TH<i>=$G_{<i>}$*TH. For the P=(k−1) numerical example, and assuming TH=1, the effective threshold values for the associated sub-receivers, from LSB to MSB are $2^{(k-1)}$, $2^{(k-2)}$, . . . , 4, 2, 1. Correspondingly, the dynamic range (DR) of the receiver circuit 100 is split across the sub-receivers.

The topology of FIG. 1 is well suited for current signals processing, where the calibration-signalling might, for example, be replicated, with different weights, on outputs of a current mirror(s).

The controller 105 processes the digital sub-receiver-output-signals 104a-104e in order to identify the sub-receiver with the most significant effective threshold value that is triggered by the calibration-signalling as a triggered-sub-receiver. In this example, the output signal of a comparator 107 has a logic high value when the associated sub-receiver is triggered. In this way, a sub-receiver is triggered when the calibration-signalling received at the receiver-input-terminal exceeds the sub-receiver's effective threshold value.

The controller 105 can then identify a preceding-sub-receiver as the sub-receiver that has an effective threshold value that is before that of the triggered-sub-receiver in the sequence of weighted effective threshold values. In this example, as will be discussed below with reference to FIG. 3, the controller 105 identifies the sub-receiver that has the effective threshold value that is immediately before that of the triggered-sub-receiver in the sequence of weighted effective threshold values as the preceding-sub-receiver.

The controller can then configure the receiver circuit 100 such that, for subsequent signal processing (i.e. after the calibration has been completed), the sub-receiver-output-signal from the identified preceding-sub-receiver is provided to the receiver-output-terminal 102.

Figure 2:
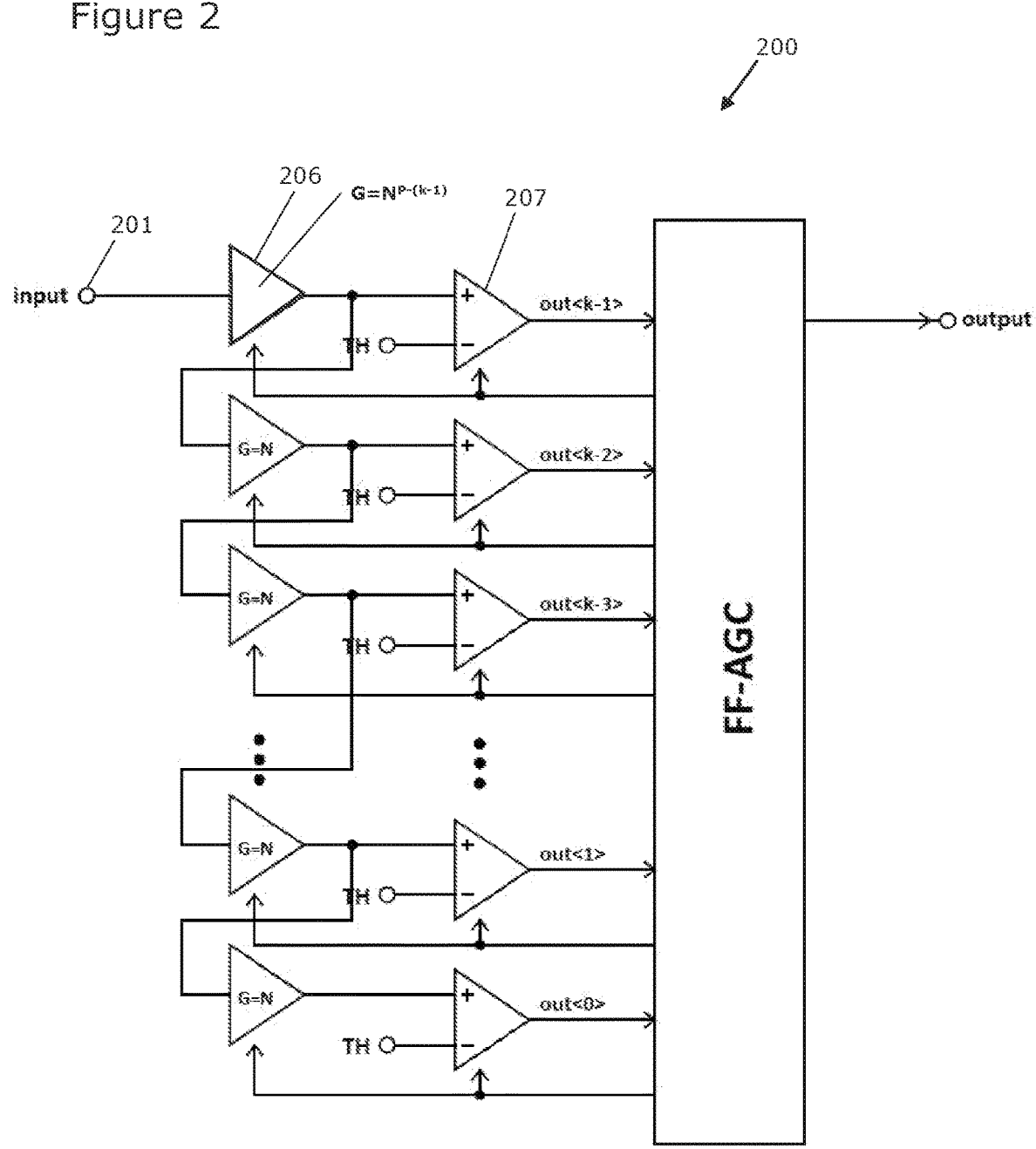
FIG. 2 shows another example embodiment of a receiver circuit.

FIG. 2 shows another example embodiment of a receiver circuit 200. Components of FIG. 2 that are also shown in FIG. 1 are identified with corresponding reference numbers in the 200 series, and will not necessarily be described again here.

In the example of FIG. 2, the amplifiers 206 of the sub-receivers are connected to the receiver-input-terminal 201 in series with each other. In this way: the amplifier-input-terminal of the amplifier 206 of a first sub-receiver (which corresponds to the most significant effective threshold) is connected directly to the receiver-input-terminal 201; and the amplifier-input-terminal of each of the amplifiers 206 of the other sub-receivers is connected to the amplifier-output-terminal of the amplifier 206 of another sub-receiver. In this way, a series chain of sub-receivers is provided. In the same way as FIG. 1, the comparators 207 of the sub-receivers are configured to compare the amplifier-output-signal from its associated amplifier 206 with the same threshold value. The amplifiers 206 of the sub-receivers can each apply the same gain factor, such that the series connection of the amplifiers 206 results in an effective gain factor for each sub-receiver in the series to be an accumulation of the previously applied gain factors. In FIG. 2, the gain factor of each amplifier 206 is G=N, except the $1^{st}$ one, having G=$N^{P-(k-1)}$, with the same notation that is used above. Note that the gain factor for each amplifier, after the $1^{st}$ one, in this example does not depend on the index <i> of the sub-receiver. FIG. 2 represents another implementation for achieving the different effective threshold values that are described above. In a further still example, the sub-receivers can be provided in parallel with each other, their amplifiers can each apply the same gain factor, and the threshold values that are applied to the comparators can be different for the different sub-receivers in order to implement the different effective threshold values.

The topology of FIG. 2 is well suited for voltage signals processing, as a high bandwidth high gain amplifier can be more easily constructed from high bandwidth low gain stages.

Although FIG. 1 shows a purely parallel implementation of the receiver circuit and FIG. 2 shows a purely series implementation, it will be appreciated that in other examples the receiver circuit can be implemented with a combination of parallel and series connected sub-receivers, and/or a combination of current and voltage processing modes with corresponding VI or IV conversion between them.

For both FIGS. 1 and 2, the digital sub-receiver-output-signals from the sub-receivers are processed by the controller, which can be considered as applying a Feed-Forward Automatic Gain Control (FF-AGC) algorithm. As indicated above, the controller selects which sub-receiver will be used for signal processing, such that it's digital sub-receiver-output-signal is forwarded to the output. Optionally, as will be discussed below, the controller can shutdown one or more of the sub-receivers that are not needed in order to reduce the power consumption of the receiver circuit.

The receiver topology of FIGS. 1 and 2 looks and works like a flash type ADC, which estimates at calibration the strength of the input signal at the receiver-input-input. By using this analogy, the sub-receivers' indexes <0>, <1>, . . . can be considered as the less significant. Similarly, the sub-receivers' indexes <k−1>, <k−2>, . . . can be considered the most significant.

Figure 3:
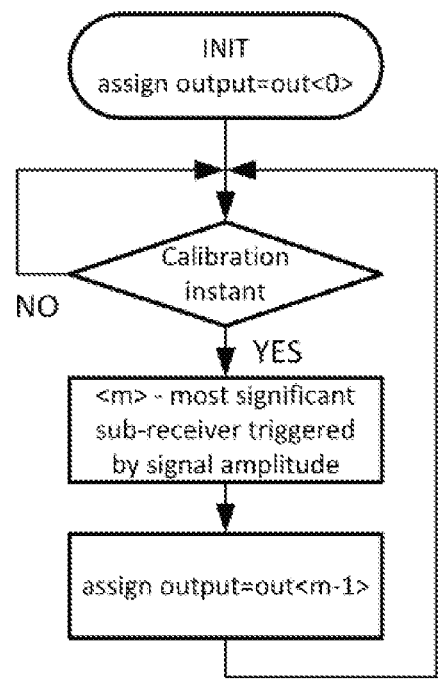
FIG. 3 shows schematically an example embodiment of a method of calibrating a receiver circuit, such as the ones shown in FIGS. 1 and 2.

FIG. 3 shows schematically an example embodiment of a method of calibrating a receiver circuit, such as the ones shown in FIGS. 1 and 2.

The method of FIG. 3 supposes that at initial state, all sub-receivers are active. The method listens for calibration-signalling such that it can detect a calibration instant. This can involve the method processing at least the digital sub-receiver-output-signals that corresponds to the least significant value (output <0>), although digital sub-receiver-output-signals can be combined, in order to detect a calibration instant. A detectable calibration instant in signalling received at the receiver-input-terminal can be implemented in any of a number of ways, including: a long pulse (such as a pulse that is longer than a threshold duration); a start of message (SOM); and a first signal after a reset.

Following detection of a calibration instant, the method detects <m> as the index of the most significant sub-receiver that has been triggered by the amplitude of the signal at the receiver-input-terminal. This is what is referred to above as the triggered-sub-receiver. The identification of the triggered-sub-receiver indicates that the signal strength has a value that is in the range between <m> (the effective threshold that is represented by the triggered-sub-receiver) and <m+1> (the effective threshold that is represented by the sub-receiver that is after the triggered-sub-receiver in the sequence). The method can then identify a preceding-sub-receiver as the sub-receiver that has an effective threshold value that is immediately before that of the triggered-sub-receiver in the sequence of weighted effective threshold values, and assign the output of the preceding-sub-receiver as the output of the receiver circuit: <s>=<m−1> for subsequent input signal reception. In this way, the output of the preceding-sub-receiver is forwarded to the receiver-output-terminal after the detected calibration instant.

The utilization of multiple sub-receivers allows the dynamic range (DR) of input signal to be split across sub-ranges, which can simplify the requirements of the sub-receiver circuits because they individually process a limited signal sub-range from TH×G<s+1> to TH×G<s+2>. Therefore, the sub-receiver that has the effective threshold TH×G<s> will be used to process the signal, which is in the range from N to $N^2$ times larger than the threshold of the sub-receiver. For instance, when N=2, the signal is in range from 2 . . . 4 times of the effective threshold. For better positioning of the effective threshold, some other methods can be utilized; for example another AGC can be used to preserve constant signal amplitude on comparator input or a signal amplitude peak detector can be used to adjust the effective threshold with respect to signal amplitude. This latter example will be described in more detail below. Whichever method is utilized, to the time of the next calibration, TH×G<S> value should be returned to its initial value.

The signal condition that is detected as a calibration instant can be unique and can differentiate from normal message content. Beneficially, the calibration instant can occur at the beginning of message. Less significant sub-receivers can saturate at high amplitude of input-signalling and can have a reduced reaction speed or can even get stuck at high levels. In some circumstances, a first long input signal pulse is a reasonable choice for Start-Of-Message (SOM). In this way, the receiver circuit can be calibrated at single time instant by detecting a long duration of SOM pulse. It will be appreciated that examples disclosed herein are not limited to use of a long SOM pulse as a detectable calibration instant; gain calibration can be also performed in response to detecting any duration pulse, which can be outside of the message frame or can follow after a unique End-Of-Message (EOM).

If the signal amplitude changes from message to message, the method of FIG. 3 supposes that all sub-receivers are active all the time and that calibration is allowed after message completion and its End-Of-Message (EOM) confirmation.

However, for systems operating at near constant amplitude of the incoming signal at the receiver-input-terminal, for example optical communication over a fixed distance, the method of FIG. 3 can be enhanced for power saving by performing "incremental" calibration, as will now be described with reference to FIG. 4.

Figure 4:
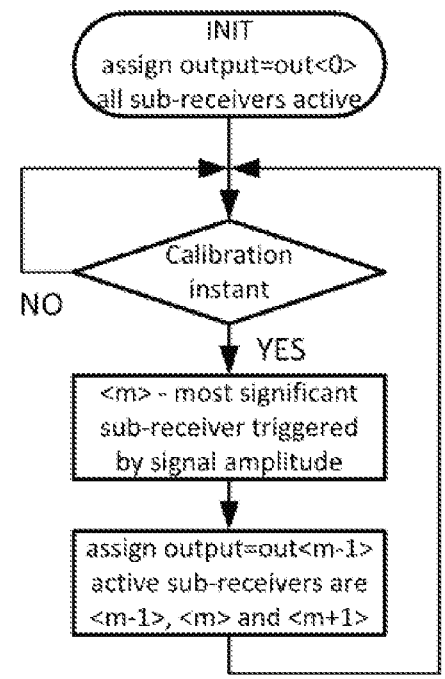
FIG. 4 shows schematically another example embodiment of a method of calibrating a receiver circuit, such as the ones shown in FIGS. 1 and 2.

FIG. 4 shows schematically another example embodiment of a method of calibrating a receiver circuit, such as the ones shown in FIGS. 1 and 2.

FIG. 4 can be considered as applying an incremental calibration algorithm. As will be discussed below, this example disables one or more of the sub-receivers, but not the preceding-sub-receiver (i.e., the one that has been assigned as the output (<s>=out<m−1>), for subsequent signal processing.

After a successful calibration instant (as described above with reference to FIG. 3), the sub-receiver with index <s> (which corresponds to <m−1>) remains active for input signal reception. In this example, the sub-receivers with indexes <s+1>, <s+2> (which correspond to <m> and <m+1>) also remain active to enable signal amplitude change detection at the next calibration instant. All other sub-receivers are disabled by the method of FIG. 4. If the signal strength increases at the next detected calibration instant, then the method sets <m>=<s+2> and new <s>=<s+1>. If the signal strength decreases at the next detected calibration instant, then the method sets <m>=<s> and new <s>=<s−1>. Correspondingly, apart from <s>, <s+1> and <s+2>, the other sub-receivers are not needed to detect the change in signal amplitude and therefore they can be disabled for power saving. An exception to the above can be down for <s−1> sub-receiver, if its activation time can impact on performance in situation of signal strength decrease. For example, with a 2Mbaud baud rate and a signal amplitude decrease, the <s−1> sub-receiver needs to be activated in less 500 ns, which can be challenging. Therefore, the implementation of the circuit can be made simpler by just keeping the <s−1> sub-receiver active.

The example of FIG. 4 can, more generally, involve the method disabling one or more of the sub-receivers, but not:
i) the preceding-sub-receiver; and ii) one or more sub-receivers that are configured to apply effective threshold values that are neighbours to the effective threshold value of the preceding-sub-receiver in the sequence of weighted effective threshold values. That is, the method can:
    enable: i) the preceding-sub-receiver; and ii) the one or more sub-receivers that are configured to apply effective threshold values that are neighbours to the effective threshold value of the preceding-sub-receiver in the sequence of weighted effective threshold values; and
    disable all other sub-receivers.

The method may not disable one or more sub-receivers that are configured to apply effective threshold values that have neighbouring effective threshold values that are higher than that of the preceding-sub-receiver in the sequence of weighted effective threshold values. Additionally or alternatively, the method may not disable one or more sub-receivers that are configured to apply effective threshold values that have neighbouring effective threshold values that are lower than that of the preceding-sub-receiver in the sequence of weighted effective threshold values.

Advantageously, the approach described herein offers instant feedforward calibration without requiring a large circuit overhead, which can be performed by a 1st received SOM pulse of a message. There can be no need to increase the size of a message preamble, which, of course, would reduce space for the message payload and might be incompatible with protocol requirements. The input dynamic range (DR) of examples disclosed herein can be reasonably large and exceed those that are known in art for AGCs, which can rarely exceed 30 dB.

Examples disclosed herein relate to a new way of Feed-Forward Automatic Gain Control, which unitizes multiple sub-receivers and re-uses them for instant high-speed feedforward gain calibration purpose. Advantageously, there can be no need for an auxiliary path to control the gain of the signal path, which, depending on the implementation, might require time for gain settling.

Examples disclosed herein are well-suited to optical receiver circuits, such as those that cover a 60 dB dynamic range.

A part of the consideration of the high Dynamic Range (DR) of the input signal, Infra-Red (IR) or Visible-Light Communication (VLC), targeting both free-to-air and low-cost plastic fibre communication applications, also operate at a sufficiently high level of Inter-Symbol Interference (ISI) because of speed limitation of available optical-electrical transducers. To avoid excessive elongation or shortening of received signal pulses in the presence of ISI and associated errors in digital symbol decoding, the receiver's threshold should be well positioned in the middle of signal amplitude, given by its maximum and minimum amplitude envelopes.

Two methods that can be utilized for better positioning of the effective threshold are, for example: i) use of another AGC to preserve constant signal amplitude on the comparator input; or ii) a signal amplitude peak detector can be used to adjust the effective threshold with respect to signal amplitude, as mentioned previously.

Solutions can be focused on processing in the voltage domain. On the input of the receiver, a Trans-Impedance Amplifier (TIA) can be used, followed by limiting amplifiers with possible Automatic Gain Control (AGC). Voltage mode peak signal detectors can also be used for receiver threshold positioning. There is no AGC known in art that can cover the required DR. If AGC is implemented as a feedback type loop, it can require a message preamble, which might not be allowed by a communication protocol. Feedforward gain calibration may not require message content overhead, but, in voltage domain, may require a multitude of series-connected low gain stages, which can result in some excessive offset, noise and delays.

Low-frequency "dark" and ambient lighting sources induced photocurrents might be commeasurable with lowest signal currents. High-Pass Filtering (HPF) or DC Offset Cancellation (DCOC) loops are normally utilized in the voltage domain to mitigate such and other offset sources. However, a half-duplex arrangement of transmitting Light Emitting Diode (LED) and receiving photodiode supposes a possibility, due to light refection in lenses or in waveguide, to have in the photodiode backward TX communication induced current, whose amplitude might exceed the amplitude of the normally received signal current. Receivers, utilizing HPFs or DCOCs, can require a certain time to recover and should hold offsets on capacitors during the entire time of a transmitter (TX) communication. However, the hold time cannot be infinite because of charge lost due to leakages in the integrated capacitor. This creates restrictions on how long a TX communication is allowed and how fast the receiver can recover after it. This problem can be overcome by using a valley detector (i.e., a peak detector that is implemented such that it detects the minimum value of a signal instead of the maximum value of the signal), that does not have any recovery time after TX communication as it tracks the bottom envelope of the signal. It can mitigate against different offset sources as well as track incomplete signal return to zero level due to ISI.

The above problems are addressed by the optical receiver that is described below, which can keep signal processing in the current domain, and is also able to cover the required DR and suitable for feedforward gain calibration. It can utilize current mode peak and valley signal amplitude detectors to find the position of the receiver's threshold in the middle of signal amplitude and to effectively cancel all offset source, including "dark" and ambient induced photocurrent. Due to the absence of HPFs or DCOCs, there is no recovery time after backward TX communication.

Figure 5:
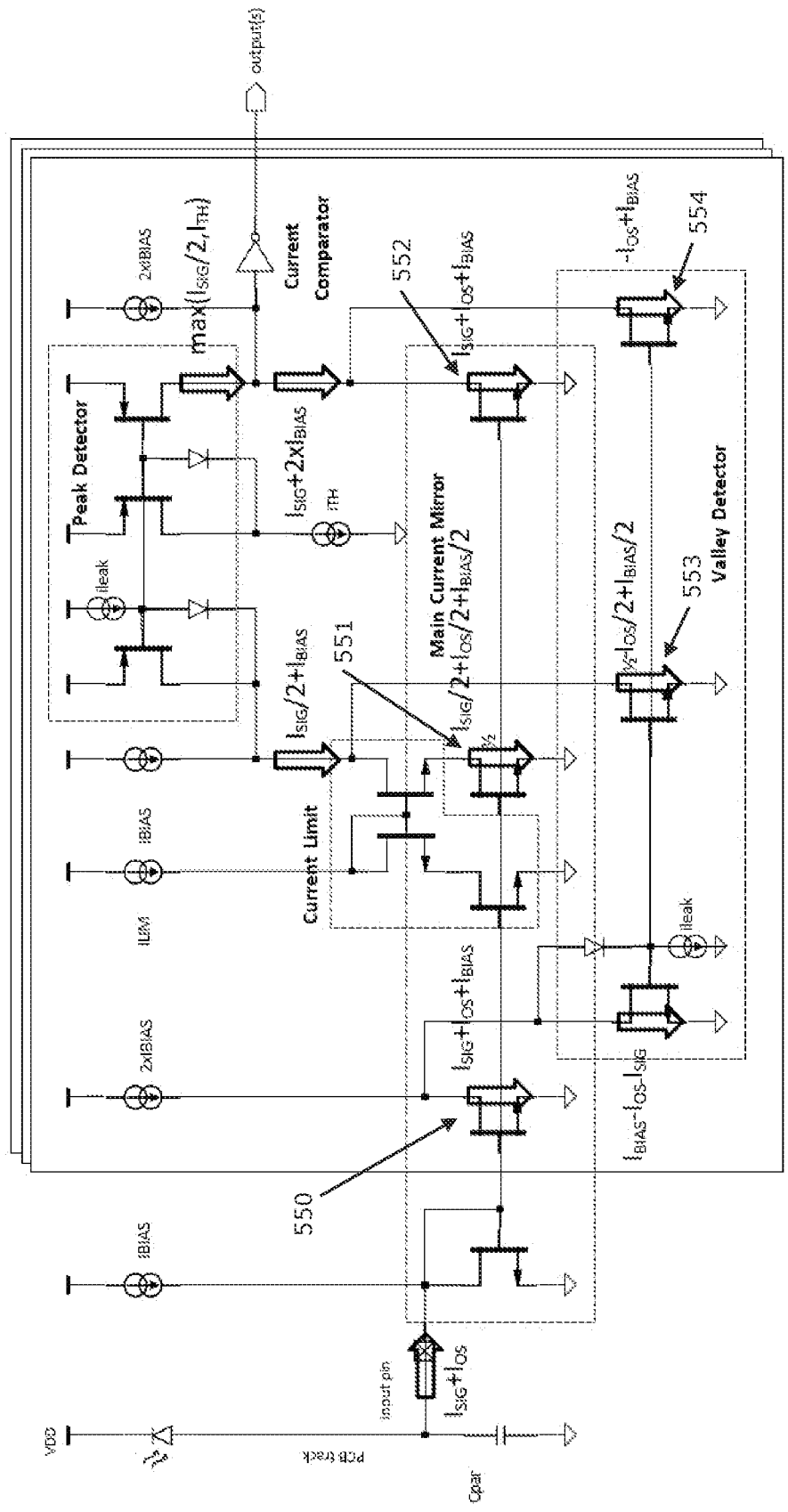
FIG. 5 shows an optical receiver circuit.

FIG. 5 shows an optical receiver circuit. The optical receiver circuit is a common input circuit, presented in this embodiment by a "diode" connected n-channel MOSFET as the input of a Common Current Mirror, and multiple receiver circuits, having similar circuitry. The input "diode" connected n-channel MOSFET, biased by IBIAS current, sets input impedance and reception bandwidth of the receiver. The Main Current Mirror has multiple outputs to deliver scaled signal current ISIG to multiple receiver circuits. With respect to the $1^{st}$ embodiment of a receiver circuit, shown in FIG. 1, inside each <i> sub-receiver, sizes of output MOSFETs of the Main Current Mirror is $N^{P-i}$ fraction of the size of the input "diode" connected MOSFET.

Utilization of multiple receivers enables the dynamic range (DR) of input signal ISIG to be split across multiple sub-ranges, which simplifies the requirements of the circuits, because they only need to process a limited signal sub-range. Furthermore, this approach complies with feedforward calibration, which can be performed already by amplitude of a $1^{st}$ pulse of the message. However, the illustrated implementation of a sub-receiver can be utilized in combination with different kinds of AGC as well as independent circuit solution for other applications; it is not limited to signal reception.

Each sub-receiver, presented in this embodiment, utilizes outputs of the Main Current Mirror, scaled by fraction $N^{P-i}$ for corresponding DR sub-range, Valley and Peak Detectors, optional Current Limit and Current Comparator on the output.

The valley detector circuit mitigates offset of the circuit itself, as well as photodiode's "dark" current IOS. The valley detector can be considered as a Peak Detector circuit, with a peaking peak of 2×IBIAS-ISIG-IOS-IBIAS amplitude. When outputs of the Valley Detector are combined, in proper scale, with outputs of the Main Current Mirrors, offset and "dark" current IOS are cancelled out in steady state. Such a solution for offset cancellation is more effective then bulky High-Pass Filters or DC Offset Cancellation loops, commonly used in state-of-the-art receivers.

The Peak Detector peaks up the maximum of 2 currents: steady-state threshold and amplitude of ISIG/2. To limit current, most signal sensitive receivers may use a current limiting circuit, like the one shown in FIG. 5.

Both Valley and Peak Detectors utilize small leakages to discharge holding capacitances, which allows the circuit to track minimum and maximum signal amplitudes and keep dynamic thresholds at the middle of the actual signal amplitude, which can vary. It can help to avoid excessive elongation or shortening of received signal pulses and associated errors at digital symbol decoding.

Depending on design needs, a single Valley Detector can be shared between multiple receivers, especially, for ones sensing lowest signal amplitudes. Correspondingly, the Valley Detector can be omitted for receivers that send the highest signal amplitudes, when offset cancellation is not needed.

When there is a backward TX communication through an LED diode, located nearby or possibly sharing the same package with the photodiode, it is just required to avoid a wrong threshold setting in the Peak Detector in relation to reflections induced current in the photo diode. This can be simply achieved by disconnecting the input Peak Detector from the Main Current Mirror path through current limit circuit, during TX communication with a small switch. Optionally, the Valley Detector can be also disconnected.

The functionality of FIG. 5 can be summarised as follows. The receiver circuit includes the functionality of an amplifier, which comprises a current mirror (the main current mirror that is shown in FIG. 5). The current mirror provides three scaled output signals: a first scaled output signal 550 that is provided to a valley detector for one or more of the plurality of sub-receivers, wherein the valley detector is configured to detect the minimum value of the first scaled output signal; a second scaled output signal 551 that is provided to a peak detector for one of the plurality of sub-receivers; and a third scaled output signal 552 for current comparison by the comparator. The valley detector provides two output signals: a first valley detector output signal 553, which represents the minimum value of the first scaled output signal 550, that is provided to the peak detector such that it is subtracted from the second scaled output signal 551; and a second valley detector output signal 554, which represents the minimum value of the first scaled output signal 550, for current comparison by the comparator. The peak detector has 2 inputs and is configured to provide on its output the highest value of these 2 inputs, either: 1st) the amplitude of the received input-signalling, minus any offset subtracted by the valley detector, divided by 2 ($I_{SIG}/2$); or 2nd) the threshold value of the comparator ($I_{TH}$)—for current comparison by the comparator. For the subsequent signal processing [i.e. TX communication], the $1^{st}$ input of the peak detector is disabled. The comparator is configured to provide the digital sub-receiver-output-signal based on a comparison of the peak detector output current and a signal from the third scaled output signal 552, minus any offset subtracted by valley detector.

As indicated above, each of the peak detectors and the valley detectors may comprise one or more hold capacitors, and they may be configured to discharge their holding capacitors to track amplitude/offset changes.

Figure 6:
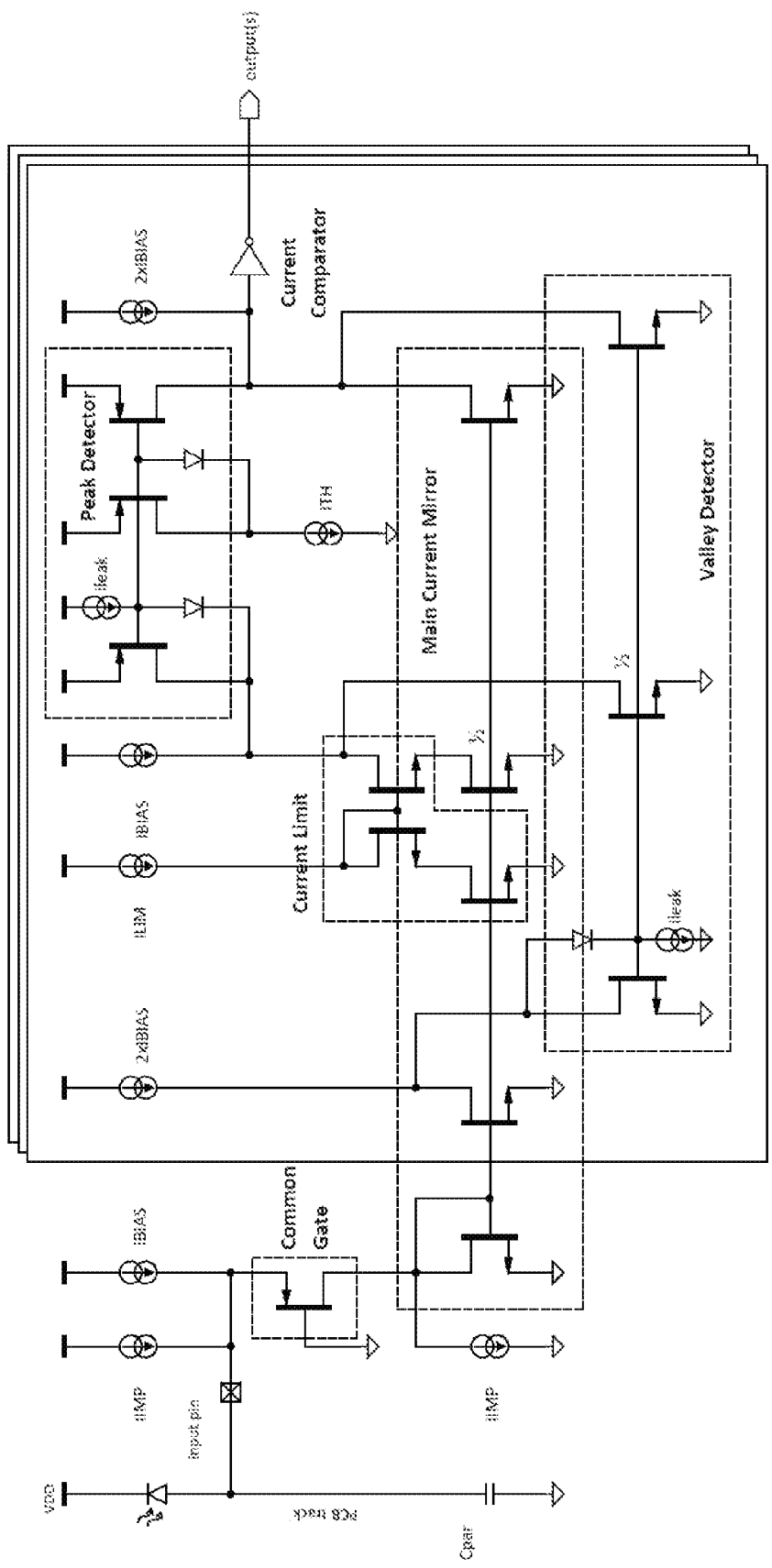
FIG. 6 shows another optical receiver circuit.

FIG. 6 shows another optical receiver circuit.

In FIG. 6 the input of the Main Current Mirror "diode" connected n-channel MOSFET, might be decoupled from the input terminal of the optical receiver by the input stage in the form of, for example, an open-loop common gate or by a feedback common gate stage. In this case, the common gate input stage sets the input impedance and reception bandwidth of the receiver, which relaxes requirements to impedance created by the "diode" connected n-channel MOSFET and reduces IBIAS current. Correspondingly, an example of the common gate input stage, required input impedance is created with the help of extra $I_{IMP}$ bias current, which is then subtracted before the input of the Main Current Mirror.

The illustrated optical receivers, which keep signal processing in the current domain, are able to cover a required dynamic range (DR) with an appropriate number of sub-receivers. However, a plurality of output MOSFETs of the Main Current Mirror can cause bandwidth limitation for a selected IBIAS current, the increase of which will deteriorate accuracy. To improve bandwidth-accuracy trade-off, number of outputs of the Main Current Mirror can be reduced with the aid of secondary Current Mirrors, for example built from p-channel MOSFETs, for a group of sub-receivers. It also enables that the counterpart of the illustrated sub-receiver circuitry can be utilized, when the input Current Mirror is built from p-channel MOSFETs. FIG. 5 depicts an example of how to apply and subtract IBIAS in Peak, Valley Detectors and have it compensated on the input of the current comparator in the sub-receivers. However, it will be appreciated that there are many alternative implementations for achieving the same functionality.

Therefore, also disclosed herein is an optical receiver, which keeps signal processing in the current domain, is able to cover required DR, and is suitable for feedforward gain calibration. It can utilize current mode peak and valley signal amplitude detectors to find the position of receiver's threshold in the middle of signal amplitude and to effectively cancel all offset sources, including "dark" and ambient induced photocurrent. Due to the absence of HPFs or DCOCs, advantageously there is almost no recovery time after backward TX communication.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A receiver circuit, comprising:
   an receiver-input-terminal configured to receive input-signalling;
   an receiver-output-terminal configured to provide output-signalling;
   a plurality of sub-receivers, each configured to compare the received input-signalling with a different effective threshold value in order to provide a digital sub-receiver-output-signal, wherein the different effective threshold values have weighted values in a sequence between a least significant value and a most significant value;
   a controller configured to, in response to detecting calibration-signalling at the receiver-input-terminal:
      process the digital sub-receiver-output-signals in order to identify the sub-receiver with the most significant effective threshold value that is triggered by the calibration-signalling as a triggered-sub-receiver;
      identify a preceding-sub-receiver as the sub-receiver that has an effective threshold value that is before that of the triggered-sub-receiver in the sequence of weighted effective threshold values; and
      configure the receiver circuit such that, for subsequent signal processing, the sub-receiver-output-signal from the preceding-sub-receiver is provided to the receiver-output-terminal.

2. The receiver circuit of claim 1, wherein each of the plurality of sub-receivers comprises:
   an amplifier, wherein the amplifier has: an amplifier-input-terminal that is configured to receive the input-signalling from the receiver-input-terminal; and an amplifier-output-terminal that is configured to provide an amplifier-output-signal based on an associated gain factor; and a comparator, wherein the comparator is configured to compare the amplifier-output-signal with a threshold value in order to provide the digital sub-receiver-output-signal.

3. The receiver circuit of claim 2, wherein the amplifiers and comparators of two or more of the sub-receivers are configured to apply different gain factors and/or threshold values such that the associated sub-receiver is configured to compare the received input-signalling with an effective threshold value that is based on the gain factor and threshold value.

4. The receiver circuit of claim 3, wherein the comparators of the two or more sub-receivers are configured to compare the amplifier-output-signal from its associated amplifier with the same threshold value, but with different effective threshold values that are based on different gain factors.

5. The receiver circuit of claim 2, wherein the two or more amplifiers are provided in parallel such that their amplifier-input-terminals are connected together such that they receive the same amplifier-input-signal.

6. The receiver circuit of claim 1, wherein the amplifiers of one or more of the sub-receivers are provided in series such that:
the amplifier-input-terminal of the amplifier of the one or more of the sub-receivers is connected to the amplifier-output-terminal of the amplifier of another one of the sub-receivers.

7. The receiver circuit of claim 2, wherein:
the amplifier-input-terminal of the amplifier of a first sub-receiver is connected to the receiver-input-terminal; and
the amplifier-input-terminals of the amplifiers of the other sub-receivers are connected to the amplifier-output-terminal of the amplifier of another one of the sub-receivers.

8. The receiver circuit of claim 7, wherein the amplifiers of two or more of the sub-receivers are configured to apply the same gain factor.

9. The receiver circuit of claim 7, wherein the comparators of the sub-receivers are configured to compare the amplifier-output-signal from its associated amplifier with the same threshold value.

10. The receiver circuit of claim 1, wherein the controller is configured to:
for subsequent signal processing, disable one or more of the sub-receivers, but not the preceding-sub-receiver.

11. The receiver circuit of claim 1, wherein the controller is configured to:
for subsequent signal processing, disable one or more of the sub-receivers, but not:
the preceding-sub-receiver; and
one or more sub-receivers that are configured to apply effective threshold values that are neighbours to the effective threshold value of the preceding-sub-receiver in the sequence of weighted effective threshold values.

12. The receiver circuit of claim 11, wherein the controller is configured to disable one or more of the sub-receivers, but not:
one or more sub-receivers that are configured to apply effective threshold values that have effective threshold values that are higher than that of the preceding-sub-receiver in the sequence of weighted effective threshold values; and or
one or more sub-receivers that are configured to apply effective threshold values that have effective threshold values that are lower than that of the preceding-sub-receiver in the sequence of weighted effective threshold values.

13. The receiver circuit of claim 3, wherein:
the amplifier comprises a current mirror, that is configured to provide three scaled output signals:
a first scaled output signal that is provided to a valley detector for one or more of the plurality of sub-receivers, wherein the valley detector is configured to detect the minimum value of the first scaled output signal;
a second scaled output signal that is provided as an input to a peak detector for one of the plurality of sub-receivers; and
a third scaled output signal for current comparison by the comparator,
wherein the valley detector is configured to provide two output signals:
a first valley detector output signal, which represents the minimum value of the first scaled output signal, that is provided as another input to the peak detector such that it is subtracted from the second scaled output signal;
a second valley detector output signal, which represents the minimum value of the first scaled output signal, for current comparison by the comparator;
wherein the peak detector is configured to provide on its output the highest value among its inputs, either: i) the amplitude of the received input-signalling as provided by the second scaled output signal, divided by 2; or ii) the threshold value of the comparator;
wherein the comparator is configured to provide the digital sub-receiver-output-signal based on a comparison of the peak detector output signal and the third scaled output signal.

14. The receiver circuit of claim 13, wherein for the subsequent signal processing, the input of the peak detector that is provided by the second scaled output signal is disabled.

15. A method of calibrating a receiver circuit, the receiver circuit comprising a plurality of sub-receivers, the method comprising:
each of the plurality of sub-receivers comparing received input-signalling with a different effective threshold value in order to provide a digital sub-receiver-output-signal, wherein the different effective threshold values have weighted values in a sequence between a least significant value and a most significant value;
in response to detecting calibration-signalling at the receiver-input-terminal:
processing the digital sub-receiver-output-signals in order to identify the sub-receiver with the most significant effective threshold value that is triggered by the calibration-signalling as a triggered-sub-receiver;
identifying a preceding-sub-receiver as the sub-receiver that has an effective threshold value that is before that of the triggered-sub-receiver in the sequence of weighted effective threshold values; and
configuring the receiver circuit such that, for subsequent signal processing, the sub-receiver-output-signal from the preceding-sub-receiver is provided to a receiver-output-terminal.

16. The receiver circuit of claim 3, wherein the two or more amplifiers are provided in parallel such that their amplifier-input-terminals are connected together such that they receive the same amplifier-input-signal.

17. The receiver circuit of claim 2, wherein the amplifiers of one or more of the sub-receivers are provided in series such that:
> the amplifier-input-terminal of the amplifier of the one or more of the sub-receivers is connected to the amplifier-output-terminal of the amplifier of another one of the sub-receivers.

18. The receiver circuit of claim 2, wherein the controller is configured to:
> for subsequent signal processing, disable one or more of the sub-receivers, but not the preceding-sub-receiver.

19. The receiver circuit of claim 2, wherein the controller is configured to:
> for subsequent signal processing, disable one or more of the sub-receivers, but not:
> > the preceding-sub-receiver; and
> > one or more sub-receivers that are configured to apply effective threshold values that are neighbours to the effective threshold value of the preceding-sub-receiver in the sequence of weighted effective threshold values.

20. The receiver circuit of claim 8, wherein the comparators of the sub-receivers are configured to compare the amplifier-output-signal from its associated amplifier with the same threshold value.

* * * * *